United States Patent [19]

McCullough

[11] 4,326,250

[45] Apr. 20, 1982

[54] DATA PROCESSING APPARATUS WITH SERIAL AND PARALLEL PRIORITY

[75] Inventor: Robert B. McCullough, Milpitas, Calif.

[73] Assignee: Magnuson Computer Systems, Inc., San Jose, Calif.

[21] Appl. No.: 83,239

[22] Filed: Oct. 10, 1979

[51] Int. Cl.³ .............................................. G06F 15/16
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,668,649 | 6/1972 | Pedersen et al. | 364/200 |
| 3,772,656 | 11/1973 | Serracchioli et al. | 364/200 |
| 3,993,981 | 11/1976 | Cassarino, Jr. et al. | 364/200 |
| 4,047,158 | 9/1977 | Jennings | 364/900 |
| 4,067,059 | 1/1978 | Derchak | 364/200 |
| 4,071,908 | 1/1978 | Brophy et al. | 364/900 |
| 4,106,104 | 8/1978 | Nitta et al. | 364/900 |
| 4,133,042 | 1/1979 | Wallace | 364/900 |
| 4,144,583 | 3/1979 | Lawson et al. | 364/900 |

*Primary Examiner*—Gareth D. Shaw
*Assistant Examiner*—David Y. Eng
*Attorney, Agent, or Firm*—David E. Lovejoy

[57] ABSTRACT

A combined serial priority and parallel priority apparatus and method of operation for use in data processing systems. Each of the parallel priority circuits are interconnected by a common parallel priority bus which carries parallel priority signals indicating the priority level of any unit requesting access. If a unit requesting access has a lower priority than indicated on the parallel priority bus, that requesting unit is inhibited from obtaining access. If a requesting unit has higher priority than the signals on the parallel priority bus, that unit in turn causes the priortiy bus to be switched to the higher priority level.

The serial priority circuits act together with other serial priority circuits within a group of priority circuits set to the same parallel priority. In this configuration, the parallel priority circuits perform a high-order priority determination while the serial priority circuits perform a low-order priority determination. A unit requesting access will be granted access only when its parallel priority is equal to or greater than the parallel priority signal on the parallel priority bus and only when its serial priority is greater than any other unit commonly connected in the serial priority configuration.

11 Claims, 7 Drawing Figures

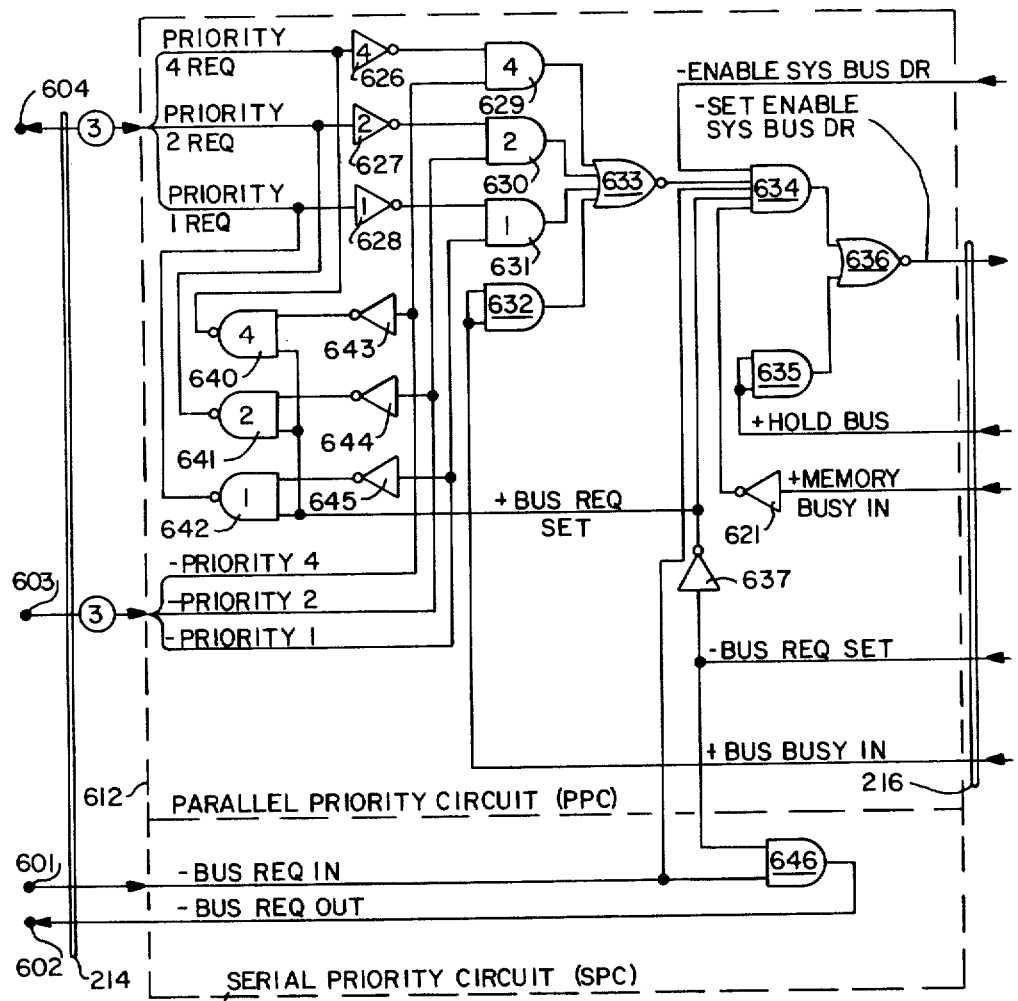
FIG.—4
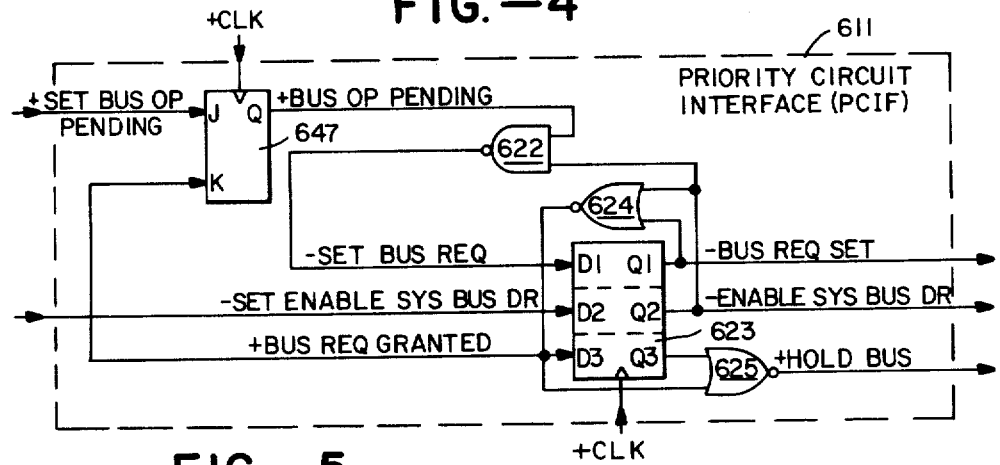
FIG.—5

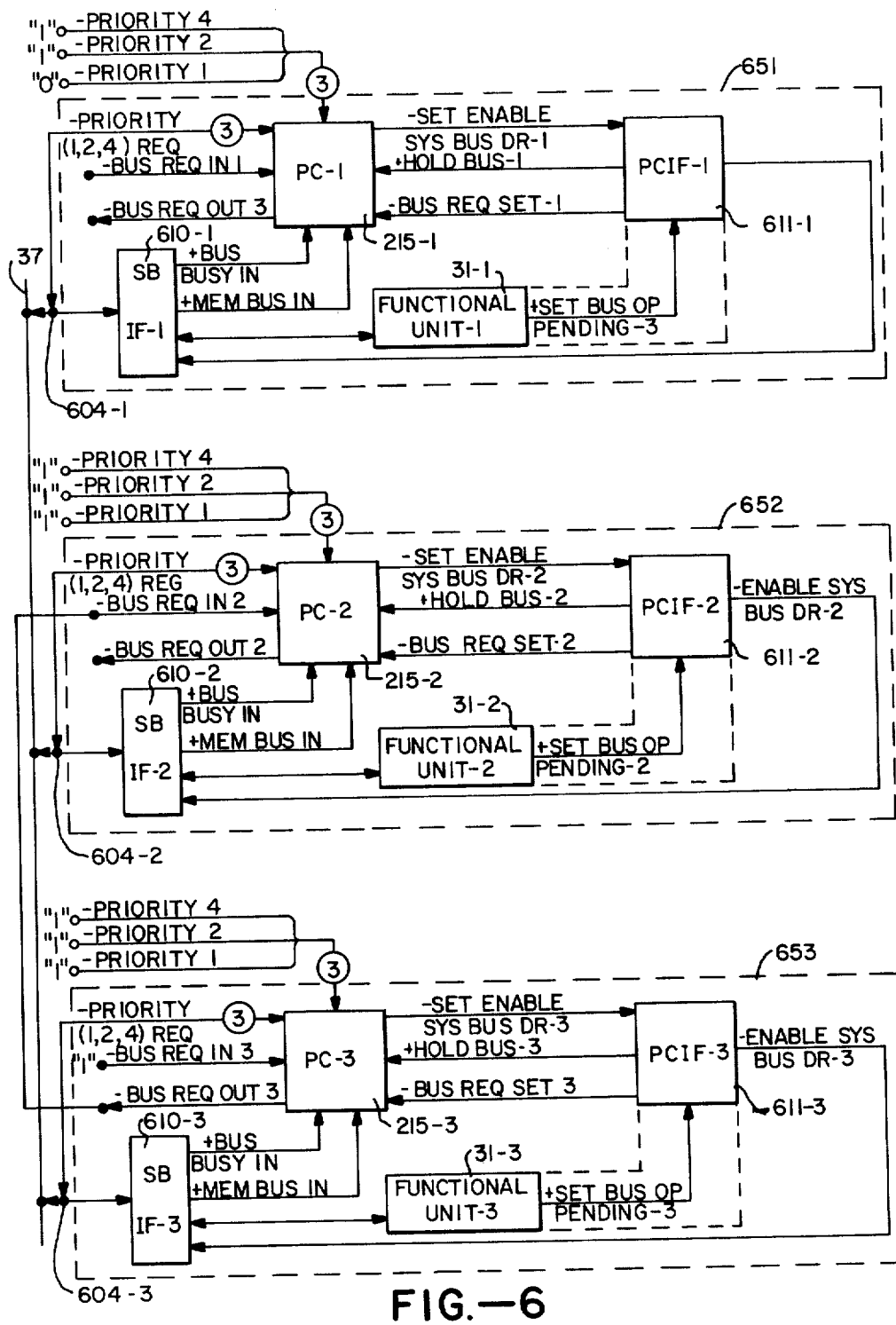
FIG.—6

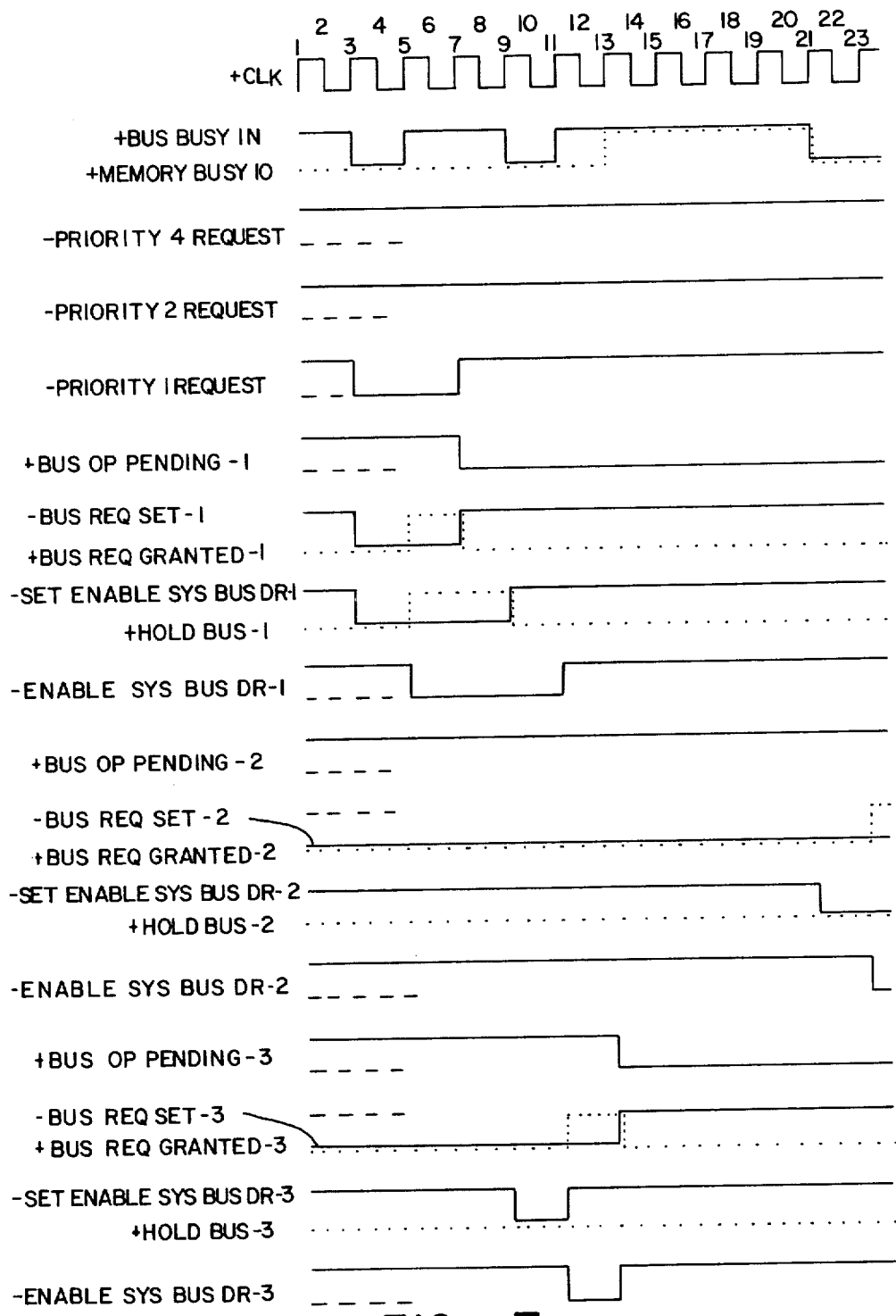
FIG.—7

DATA PROCESSING APPARATUS WITH SERIAL AND PARALLEL PRIORITY

CROSS REFERENCE TO RELATED APPLICATIONS

Cross Reference is made to application Ser. No. 949,924, filed Oct. 10, 1978, by: Carlton G. Amdahl and entitled COMPUTER AND METHOD FOR EXECUTING TARGET INSTRUCTIONS now U.S. Pat. No. 4,245,302 issued Jan. 13, 1981.

Cross Reference is made to application Ser. No. 083,471, filed Oct. 10, 1979, by Robert B. McCullough and entitled DATA PROCESSING APPARATUS AND METHOD WITH ENCODED SYSTEM BUS, said application is a continuation-in-part of application Ser. No. 949,923, filed Oct. 10, 1978.

Cross Reference is made to application Ser. No. 083,240, filed Oct. 10, 1979, by Robert B. McCullough and entitled DATA PROCESSING APPARATUS WITH PARALLEL ENCODED PRIORITY.

BACKGROUND OF THE INVENTION

The present invention relates to the field of instruction-controlled digital computers and specifically to the interconnection of and the priority determinations among the units forming the data processing system.

High-speed data processing systems generally include a plurality of units interconnected over one or more buses. Typical units connected by a bus include one or more storage units for storing data and instructions, one or more input/output devices, a console for operator and other communication with the system, and a processor for instruction handling and execution.

When the units of a system are interconnected by common buses, a need arises for controlling access to the buses. When more than one unit may request an operation using the bus, a priority determination must be made so as to determine the order in which units will be able to obtain access to the bus.

Various priority techniques have been known. For example, some systems employ a serial priority technique. In the serial priority technique, the units in a system are interconnected by a "daisy chain" which connects in series from the highest priorty unit to the lowest priorty unit. The "daisy chain" circuitry operates such that a unit requesting access must be enabled by its own stage in the daisy chain circuitry. If a unit of higher priority is requesting access, the higher priority unit energizes the daisy chain circuit so that all the lower-order units are disabled and cannot obtain access. Whenever there is no higher priority unit having access, than a unit requesting access obtains access and energizes the "daisy chain" circuitry thereby inhibiting all units of lower priority from obtaining access.

Serial priority techniques work well in many environments, but they present a problem in that each unit connected into the serial priority circuitry adds an additional stage of delay to the operation of the priority circuitry. For a small number of units in the priority scheme, the delay contributed by each stage is small and usually can be tolerated. Where many units are to be connected into the priority scheme, however, the serial priority schemes become undesirable because of the amount of delay attendant its operation.

Serial priority techniques have other drawbacks. For example, when it is desired to have different levels of priority, serial priority techniques are generally inadequate. In order to overcome the limitations of serial priority schemes, some data processing systems have employed a centralized priority distributor. Such a centralized priority distributor receives inputs from and delivers outputs to each unit in the priority configuration. Such a centralized priority distributor, however, is difficult to implement in modular systems where the number of units in the priority configuration is large or is intended to increase. Generally, separate interconnections are required between a centralized priority distributor and each unit in the configuration. The need to make separate connections for each unit is undesirable and makes modularized systems more difficult.

In accordance with the above background, there is a need for an it is an objective of the present invention to provide improved priority circuitry for use within data processing systems.

SUMMARY OF THE INVENTION

The present invention is a combined serial priority and parallel priority apparatus, and method of operation for use in data processing systems. A plurality of units within the data processing system are connected in a priority configuration in which priority among the units must be established. Each of the units within the priority configuration includes a priority circuit including a parallel priority circuit and a serial priority circuit. Each of the parallel priority circuits are interconnected by a common parallel priority bus. The parallel priority bus carries parallel priority signals indicating the priority level of any unit requesting access. If a unit requesting access has a lower priority than indicated on the parallel priority bus, that requesting unit is inhibited from obtaining access. If a requesting unit has a higher priority than the signals on the parallel priority bus, that unit in turn causes the priority bus to be switched to the higher priority level. After the signals on the priority bus are switched to a higher priority level, any requests of a lower priority unit will not be honored. Each one of the parallel priority circuits includes means for setting a preselected parallel priority level for that unit. Each parallel priority circuit functions to compare the priority signals on the parallel priority bus with the priority level set for that parallel priority circuit. When the priority level of one unit requesting access is lower than that of some other requesting unit, the other requesting unit is given priority over the lower priority one unit.

In one particular embodiment, the parallel priority bus is encoded. In one binary example, three binary encoded lines form the parallel priority bus thus permitting eight different parallel priority levels to be established. Of course, any number of lines may be encoded to form any desired number of parallel priority levels.

At least some of the priority circuits of the present invention also include serial priority circuits. The serial priority circuits act together with other serial priority circuits within a group of priority circuits set to the same parallel priority. In this configuration, the parallel priority circuits perform a high-order priority determination while the serial priority circuits perform a low-order priority determination. A unit requesting access will be granted access only when its parallel priority is equal to or greater than the parallel priority signal on the parallel priority bus and only when its serial priority is greater than any other unit commonly connected in the serial priority configuration.

With the combined parallel priority and serial priority circuits of the present invention, an improved priority circuit and method has been achieved. The simplicity and other advantages of serial priority are obtained for groups of units having a common parallel priority.

The delay time required for operation of serial priority circuits is minimized by the use of parallel priority levels. Additionally, the priority circuits are of a modualar configuration which permits additional units to be readily added to or removed from the priority configuraion.

In accordance with the above summary, the present invention achieves the objective of providing an improved priority circuit and method of operation. The foregoing and other objects, features and embodiments of the present invention are described in more detail in conjunction with the accompanying drawings.

BRIEF DESCRIPTION OF THE DRAWINGS

FIG. 4 is a schematic electrical diagram of a typical one of the priority circuits of FIGS. 1 and 2 of the present invention.

FIG. 5 is a schematic diagram of a typical one of the priority circuit interfaces for interfacing the priority circuit of FIG. 4 with a functional unit.

FIG. 6 depicts a block diagram representing three units connected to the system bus and the interconnection of the priority circuits among and within the units.

FIG. 7 depicts waveforms representative of the operation of the priority circuits within the units of FIG. 6.

DETAILED DESCRIPTION

Figure 1:
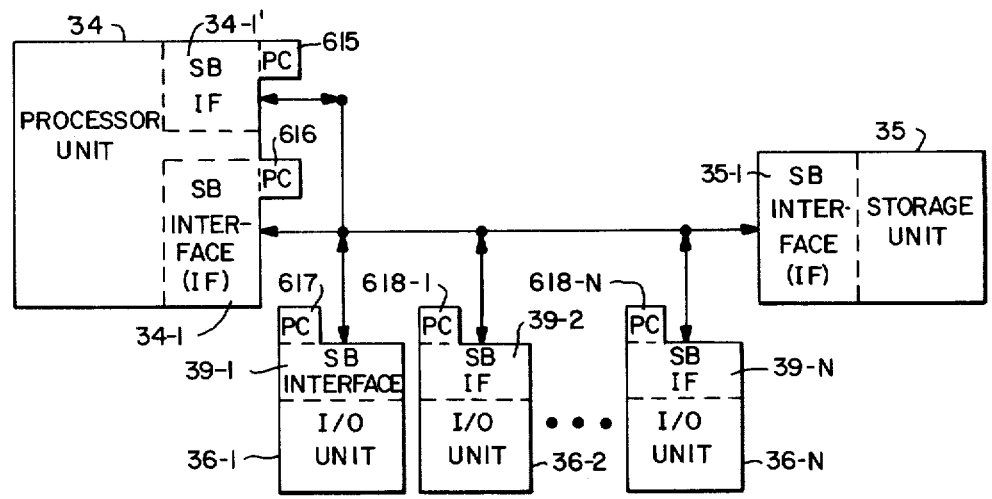
FIG. 1 is an overall block diagram of a digital computer employing parallel priority in accordance with the present invention.

In FIG. 1, a schematic block diagram of a digital computer is shown. The digital computer includes a processor unit 34, a storage unit 35 and a plurality of input/output (I/O) units 36, designated 36-1, 36-2, ..., 36-N. The units 34, 35 and 36 are interconnected by a system bus 37.

Input/output units such as units 36 of FIG. 1 typically include controllers and channels for communicating with input/output devices such as magnetic tape units, magnetic disk units and other peripheral units used with digital computers. In a typical system, an operator console is connected through one of the input-/output units 36 to the remainder of the system.

The system bus 37 connects to each of the units of FIG. 1 through a separate interface for each unit. Particularly, the processor unit 34 includes one or more system bus interfaces such as interfaces 34-1 and 34-1'. The storage unit 35 includes a storage unit system bus interface 35-1. Each of the I/O units 36 includes a corresponding system bus interface 39. The interfaces 39 are designated 39-1, 39-2, ..., 39-N in FIG. 1 corresponding to the I/O units 36-1, 36-2, ..., 36-N, respectively.

In FIG. 1, each of the system bus interfaces, except the interface 35-1, includes a priority circuit. In FIG. 1, the priority circuit 615 is associated with the interface 34-1', the priority circuit 616 with the interface 34-1, and the priority circuit 617 with the interface 39-1. The priority circuits 618-1, ..., 618-M are associated with the interfaces 39-2, ..., 39-N. The interface 35-1 does not require a priority circuit since the storage unit 35 is connected actively to the system bus only in response to requests from one of the other units.

In a typical embodiment, the system bus 37 has an information field which is 32 bits wide. The system bus information field carries information of different types between the various units of FIG. 1. The system bus 37 also includes a bus operation code field which in one embodiment is 8-bits wide. The operation code field (OP CODE) is encoded to specify the different types of information that are carried by the information field of the system bus.

In addition to the information field, and the operation code field, the system bus 37 includes a number of explicit lines. Among those lines are the priority lines including a parallel priority bus and serial priority lines. Additionally, each priority ciruit receives priority setting lines for setting the parallel priority level of the particular priority circuit.

A typical system bus operation commences when one of the units connected to the system bus has a need to utilize the system bus. The processor unit and the I/O units are all capable of requesting access to the system bus. Any unit wishing to access the system bus generates a bus request signal. Since more than one unit may request access to the system bus, the priority circuitry functions to establish priority among the units requesting access to the system bus.

If no unit of higher priority is requesting access to the system bus and if the system bus is not currently busy, then a unit seeking access to the system bus will access and take control of the system bus.

When a unit takes control of the system bus, the unit generates a bus busy signal indicating the system bus is busy and hence that no other unit can obtain access until the particular unit is finished with its operations on the system bus. The priority circuitry determines which one of the units seeking to acquire the system bus is the next one to acquire access to the system bus in accordance with the present invention.

Further details of one system bus and its operation in a system suitable for use with the present invention are described and claimed in the above-identified cross-referenced application DATA PROCESSING APPARATUS AND METHOD WITH ENCODED SYSTEM BUS.

Figure 2:
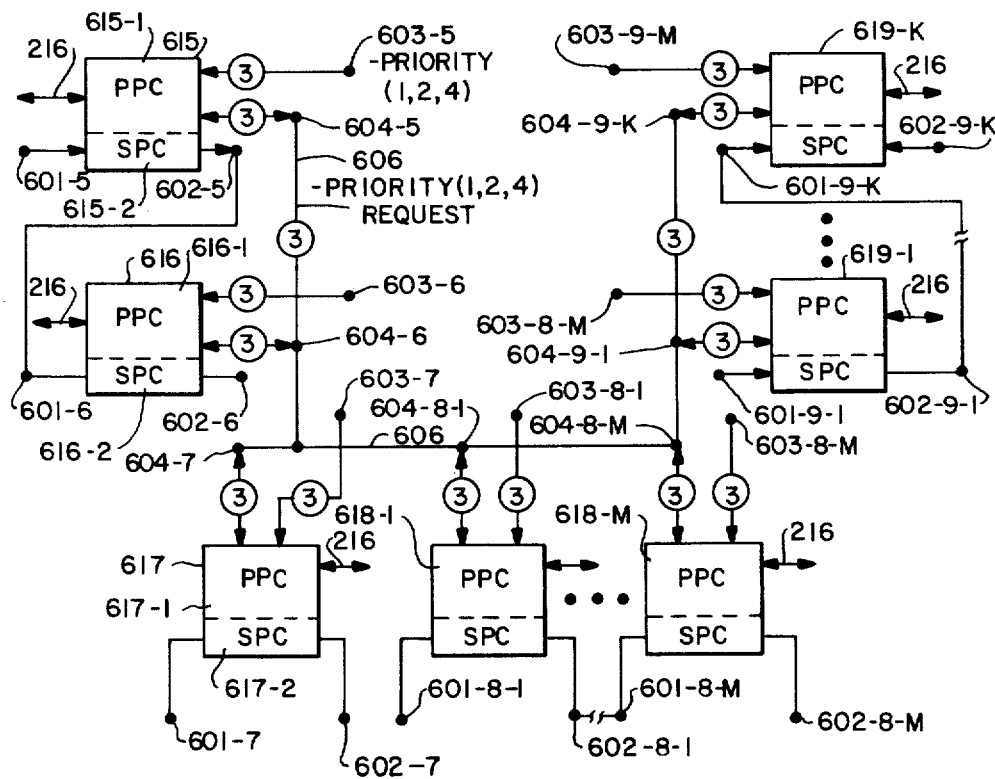
FIG. 2 is a block diagram showing further details of the priority circuits, including parallel priority circuits and serial priority circuits, and their interconnections in accordance with the present invention.

Priority Circuitry—FIG. 2

In FIG. 2, further details of the priority circuits of FIG. 1 and their interconnection are shown. In FIG. 2, the priority circuits 615, 616, 617 and 618-1, ..., 618-M correspond to the like numbered priority circuits in FIG. 1. Additionally in FIG. 2, the priority circuits 619-1, ..., 610-K are also included for additional units and interfaces not present in, but which can be added to FIG. 1.

All of the priority circuits of FIG. 2 receive a 3-bit parallel priority bus 606. The parallel priority bus 606 includes the parallel priority lines collectively designated —PRIORITY(1, 2, 4) REQUEST and individually designated as —PRIORITY 1 REQUEST, —PRIORITY 2 REQUEST and —PRIORITY 4 REQUEST. The bus 606 is binary encoded for representing up to eight different classes or levels of parallel priority. The parallel priority circuit (PPC) portion 615-1 of the priority circuit 615 is connected to the parallel priority bus 606 at terminal point 604-5. The parallel priority circuit 615-1 also receives the three priority setting lines from the input terminal 603-5. The priority setting lines are collectively designated —PRIORITY (1, 2, 4) and are individually designated as —PRIORITY 1, —PRIORITY 2, and —PRIORITY 4. The priority setting lines input from terminal 603-5 establish which one of the eight different possible priority levels the parallel priority circuit 615-1 and its corresponding interface 34-1 is to have. The priority level is set by connecting each of the three —PRIORITY(1, 2, 4) lines to logical 1 or logical 0 levels. This connection can be made in any convenient manner, either manually or if desired as the output of a register or other digital level-setting circuitry.

In addition to the parallel priority circuit 615-1, the priority circuit 615 includes a serial priority circuit (SPC) 615-2. The serial priority circuit 615-2 receives from an input terminal 601-5 a —BUS REQUEST IN serial priority signal and provides at the output terminal 602-5 the —BUS REQUEST OUT serial priority signal.

In FIG. 2, the priority circuit 616 is like the priority circuit 615. Priority circuit 616 includes the parallel priority circuit 616-1 having the —PRIORITY(1, 2, 4) inputs at terminal 603-6 and the —PRIORITY(1, 2, 4) REQUEST connection to the parallel priority bus 606 at terminal 604-6. The priority circuit 616 includes the serial priority circuit 616-2 receiving the —BUS REQUEST IN signal at terminal 601-6 and providing the —BUS REQUEST OUT signal at terminal 602-6.

In FIG. 2, the serial priority circuits 615-2 and 616-2 are interconnecte in common with the output terminal 602-5 connected to the input terminal 601-6. With this interconnection the priority circuit 615 has a higher serial priority than the priority circuit 616. Because of the interconnection of the serial priority circuits 615-2 and 616-2 it is implied that the parallel priority circuits 615-1 and 616-1 will both be set to the same preselected parallel priority levels. Accordingly, the —PRIOIRTY(1, 2, 4) inputs at terminal 603-5 and 603-6 should be the same in order to achieve the same parallel priority levels.

In FIG. 2, the priority circuit 617 includes the parallel priority circuit 617-1 and the serial priority circuit 617-2. The parallel priority circuit 617-1 is connected to the parallel priority bus 606 at the terminal 604-7 and receives the priority setting input —PRIORITY(1, 2, 4) at the terminal 603∝7. While the priority circuit 617 is shown to include the serial priority circuit 617-2, the serial priority input 601-7 and the serial priority output 607-7 are not connected to any other seeial priority circuit since the priority circuit 617 is the only one within the parallel priority group. Where only one priority circuit appears within a parallel priority group, the serial priority circuitry will not perform any function unless at a later time, additional priority circuits are included within the same parallel priority group.

In FIG. 2, the priority circuits 618-1, . . . , 618-M, imply a series M different priority ciruits. Each of those priority circuits is connected in common by means of the serial priority circuits. Accordingly, each of those circuits is presumed to receive the same parellel priority setting inputs —PRIORITY(1, 2, 4) on the input terminals 603-8-1, . . . , 603-8-M. Similarly, all of the parallel priority circuits connect to the parallel priority bus 606 at terminals 604-8-1, . . . , 606-8-M.

The priority circuits 619-1, . . . , 619-K are conncted in a common serial priority chain and hence are also presumed to receive the same parallel priority inputs.

In FIG. 2, each of the priority circuits includes output lines 216 for connecting to an associated functional unit of the type shown in FIG. 1.

Figure 3:
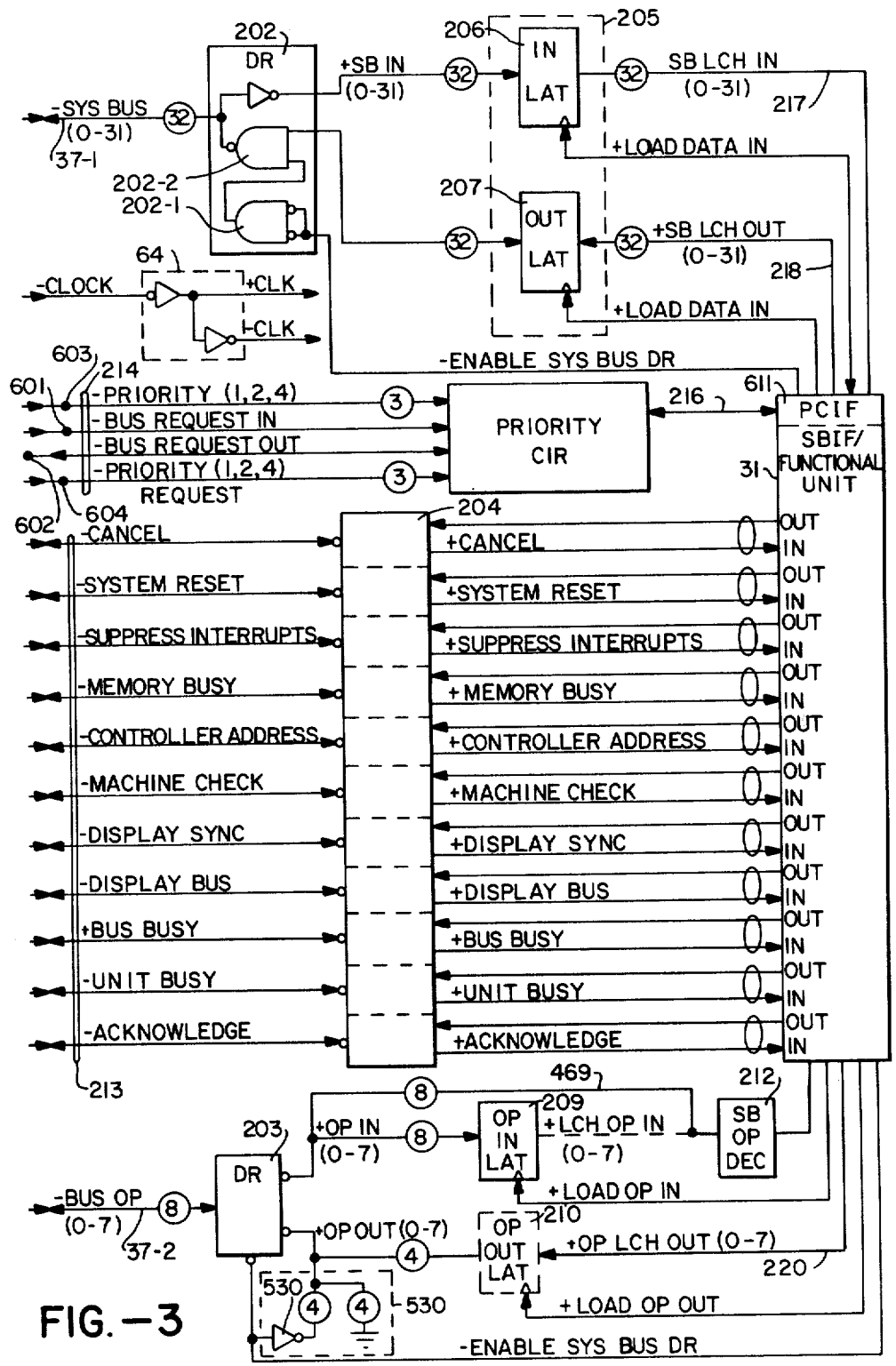
FIG. 3 is a block diagram of the system bus interface for a typical one of the units connected to the system bus of FIG. 1.

System Bus Interface—FIG. 3

In FIG. 3, a typical system bus interface is shown. The system bus interface of FIG. 3 is typical of the system bus interfaces 34-1, 35-1 and 39-0 through 39-N of FIG. 2.

In FIG. 3, the major components of the system bus are the 32-bit information field -SY BUS(0-31), the 8-bit operation code field -BUS OP(0-7), and various explicit signal lines 213 and 214. The signal lines include -PRIORITY 1, -PRIORITY 2, -PRIORITY 4, -BUS REQUEST IN, -BUS REQUEST OUT, -PRIORITY 1 REQUEST, -PRIORITY 2 REQUEST, and -PRIORITY 4 REQUEST. Additional lines include -CANCEL, -SYSTEM RESET, -SURPRESS INTERRUPTS, -MEMORY BUSY, -CONTROLLER ADDRESS, -MACHINE CHECK, -DISPLAY SYNC, -DISPLAY BUS, -BUS BUSY, -UNIT BUSY and -ACKNOWLEDGE which connect to the bidirectional drivers 204. An additional signal, -CLOCK, is distributed throughout the system to each of the units to synchronize all operations on the system bus.

The -CLOCK signal is connected as an input to the clock unit 64. The clock unit 64 is a conventional device for providing clock signals at the frequency determined by the -CLOCK signal. In one embodiment, the -CLOCK signal has a 100 nanosecond period. The clock unit 64 buffers and inverts the -CLOCK signal and provides conventional clock signals such as +CLK and −CLK for distribution internally throughout each of the units.

In FIG. 3, the bus 37-1, -SY (BUS(0-31), connects to the bidirectional driver circuit 202. Driver 202 inverts signals on each of the 32 lines 37-1 and connects them over an input bus 401, +SB IN(0-31), to the latch circuit 205. In a typical embodiment, the latch circuit 205 includes an input latch (IN LAT) 206 which latches the data from the bus -SY BUS(0-31) under control of the rising edge of +LOAD DATA IN which switches with the rising edge of the clock signal +CLK. When latched, the information from circuit 206 is available on the 32-bit system bus latch in bus 217, +SB LCH IN(0-31), which connects to other circuitry 31 located in the system bus interface 31 or located in other circuitry in the storage unit connected to the system bus interface.

Information to be transferred out onto the system bus, -SY BUS(0-31), connects from the driver 202 through gates, represented by NAND gate 202-2 (including one for each of the thirty-two bus lines). The information input to the NAND gates 202-2 is connected from the 32-bit bus 402, +SB OUT(0-31), which connects from the latch circuit 207. The data on +SB OUT(0-31) is gated to -SY BUS(0-31) only when the control gate 202-1 is enabled. Gate 202-1 is enabled by -ENABLE SYS BUS DR which is generated by the circuitry 31.

In FIG. 3, the 8-bit bus 37-2, -BUS OP(0-7), carries the bus operation code field and connects to a bidirectional driver 203. Bidirectional driver 203 is like or similar to the driver 202. Data from -BUS(0-7) is connected through driver 203 to the 8-bit input latch 209, OP IN LAT. In one embodiment, latch 209 latches the 8-bit bus op from -BUS OP(0-7) on the rising edge of the signal +LOAD OP IN which is typically switched by the rising edge of the clock signal +CLK. In an alternative embodiment, the bus +OP IN(0-7) by passes the latch 209 and connects on bus 469 as an input to the system bus op code decoder 212 (SB OP DEC).

In a similar manner, bus ops from the functional unit 31 may be, in some embodiments, clocked into the 8-bit output latch (OP OUT LAT) 210 by the rising edge of +CLK which controls the +LOAD OP OUT signal. When latched in buffer 210, the bus operation field is then available for gating out to the -BUS OP(0-7) bus under control of the -ENABLE SYS BUS DR signal. In an embodiment for the storage unit interface 35-1, latch 210 is not employed. Alternatively, a HEX F code generator 530 is employed. Whenever -ENABLE SYS BUS driver is active as a logical 0, inverter 531 inverts that signal to form logical 1's for the four high-order bits +OP OUT(0-3) thereby forcing HEX F as binary 1111. The four low-order bits +OP OUT(4-7) remain logical 0's.

The 8-bit +LCH OP IN(0-7) lines from the buffer 209, or alternatively from the driver 203, connect to the system bus operation decoder 212. The decoder 212 functions to decode the system bus op provided by the system bus 37. Decoder 212 typically has a unique decoding for each of the units to which the system bus interface of FIG. 3 is connected. The outputs from decoder 212 provide signals to the functional unit 31 for specifying the nature of the information on the bus 37-1, -SY BUS(0-31). The functional unit 31 determines whether or not to accept information provided by -SY BUS(0-31 of the nature specified by the op code provided by -BUS OP(0-7).

The signal lines 213 similarly are or can be bidirectional and connect to the drivers 204. The drivers 204 convert the bidirectional lines on the left to the pair of unidirectional lines on the right. For example, the -CANCEL line on the left of drivers 204 connects as the +CANCEL OUT and the +CANCEL IN lines on the right. The names of the signals on the right correspond to the names of the signals on the left with the additional designation OUT (representing signals transmitted out to the system bus) and the designation IN (representing signals received in from the system bus). The OUT and IN signals from the drivers 204 connect to the functional unit 31.

In FIG. 3, the lines 214 connect to a priority circuit 215. The priority circuit 215 establishes the priority among the units which have access to the system bus. Priority circuit 215 is connected to the functional unit 31 by lines 216.

The priority lines 214 include the three lines -PRIORITY(1,2,4) at terminal points 603, the -BUS REQUEST IN line at terminal point 601, the -BUS REQUEST OUT at terminal point 602 and -PRIORITY(1,2,4) REQUEST at terminal point 604.

Priority Circuit—FIG. 4

In FIG. 4, further details of a typical priority circuit (PC) 215 are shown. The priority circuit 215 of FIG. 4 includes a parallel priority circuit (PPC) 612 and a serial priority circuit (SPC) 613. The priority circuit 215 includes the parallel priority lines at terminals 601 through 604 as identified in connection with FIG. 3. Also, the priority circuit 215 includes the lines 216 for interconnecting the priority circuit 215 with an associated functional unit.

In FIG. 4, the three lines -PRIORITY 4, -PRIORITY 2 and -PRIORITY 1 are input at terminal 603 for setting the priority circuit 215 to a preestablished parallel priority level. Those priority lines are binary encoded with the binary 4, 2 and 1 for establishing any one of eight different binary levels. For example, when the lines -PRIORITY 4, -PRIORITY 2 and -PRIORITY 1 are set at binary 111 the lowest priority level is set and when set at binary 000, the highest priority level is set. The -PRIORITY 4, -PRIORITY 2 and -PRIORITY 1 lines are connected to INVERTER gates 645, 644 and 643, respectively, and to AND gates 629, 630 and 631, respectively.

The gates 643, 644 and 645 invert the parallel priority level signals to form inputs to the NAND gates 640, 641 and 642, respectively. Gates 640, 641 and 642, when enabled by a logical 1 for the +BUS REQUEST SET signal gates the priority setting signal from lines -PRIORITY(1,2,4) onto the parallel priority lines -PRIORITY 4 REQUEST, -PRIORITY 2 REQUEST and -PRIORITY 1 REQUEST, respectively.

The -PRIORITY(1,2,4) REQUEST lines connect in parallel through the terminal 604 to other priority circuits. Also, the -PRIORITY 4 REQUEST, -PRIORITY 2 REQUEST and -PRIORITY 1 REQUEST lines connect through the INVERTER gates 626, 627 and 628, respectively, to the AND gates 629, 630 and 631, respectively. The AND gates 629, 630 and 631 function to compare the priority set for the priority circuit by the priority setting lines -PRIORITY(1,2,4) with the parallel priority as inverted from the request lines -PRIORITY(1,2,4) REQUEST. All of the AND gates 629, 630 and 631 will have a logical 0 1 output if the priority set for the priority circuit is equal to or higher than the priority input on the priority requesting lines. If the priority requested is higher than the priority set for the parallel priority circuit, then one of the gates 629, 630 or 631 will have a logical 1 output. The outputs from gates 629, 630 and 631 together withthe output from gates 632 connect as inputs to the NOR gate 633. The output from gate 633 is the +PARALLEL ENABLE signal which, when active, indicates that the parallel priority level set by -PRIORITY(1,2,4) is equal to or greater than the priority signal on the parallel priority bus 606 at terminals 604. Gate 632 provides the +BUS BUSY IN signal as provided by the drivers 204 of FIG. 3. Any logical 1 input to the gate 633 causes its output to be a logical 0 which disables the priority circuit. All 0 inputs to gate 633 will provide a logical 1 output to enable the priority circuit. The output from gate 633 connects as one of the four inputs to enable or disable AND gate 634.

Another input to gate 634 in the serial priority signal -BUS REQUEST IN which connects from the output of a higher-order serial priority circuit, if any. If a higher-order serial priority circuit has indicated a logical 0 for -BUS REQUEST IN, AND gate 634 cannot be satisfied and hence the priority circuit 215 cannot gain priority.

Another input to the AND gate 634 is the +BUS REQUEST SET signal from INVERTER gate 637. The +BUS REQUEST SET signal indicates that the unit associated with the priority circuit of FIG. 4 is ready to perform an operation and hence is requesting and will have access to the system bus whenever its priority within the priority scheme is highest. Another input to the AND gate 634 is the +MEMORY BUSY IN signal as inverted in INVERTER gate 621. Whenever the memory is busy, AND gate 634 cannot be satisfied and hence the priority circuit will not enable the associated unit to obtain access to the system bus. Another input to AND gate 634 is the -ENABLE SYS BUS DR signal which enables gate 634 with a logical 1 until switched to a logical 0 one cycle after access is granted to the priority circuit.

Whenever all of the input signals to AND gate 634 are logical 1's, gate 634 provides a logical 1 to the NOR gate 636 to enable the -SET ENABLE SYS BUS DR signal as a logical 0. NOR gate 636 is also enabled with a logical 0 output whenever the +HOLD BUS signal provides a logical 1 through gate 635 to NOR gate 636. The +HOLD BUS signal becomes a logical 1 one cycle after access is granted to the priority circuit if more than one cycle is required for the operation to be performed.

In FIG. 4, the serial priority circuit (SPC) 613 includes an AND gate 646. The gate 646 receives the -BUS REQUEST IN signal from a higher-order serial priority circuit, if any. If there is no higher-order serial priority circuit, the present circuit is the highest-order serial priority circuit and therefore the -BUS REQUEST IN signal is tied high to a logical 1. The other input to the AND 646 is the -BUS REQ SET signal which is a logical 1 except when the present priority circuit is making a priority request for access to the system bus. If the present priority circuit has a priority request, as evident by a logical 0 for -BUS REQ SET, the output of AND gate 646 is a logical 0. That logical 0 disables all lower-order serial priority circuits, if any. Each lower-order serial priority circuit will have a logical 0 output from a duplicate AND gate 646. A logical 0 on the -BUS REQUEST IN from any higher-order serial priority circuit will force a logical 0 output from AND gate 646 in each lower-order serial priority circuit.

The -BUS REQUEST IN from a higher-order serial priority circuit is also connected as an input to AND gate 634 in the parallel priority circuit 612. A logical 0 for the -BUS REQUEST IN serial priority signal inhibits AND gate 634 from being satisfied and thus inhibits the enabling of the system bus driver signal. Accordingly the signal -ENABLE SYS BUS DR is maintained as a logical 1 and the unit associated with the priority circuit is prevented from placing any information onto the system bus.

Priority Circuit Interface—FIG. 5

In FIG. 5, a typical priority circuit interface (PCIF) 611 is shown. The priority circuit interface is part of the system bus interface/functional unit 31 such as shown in FIG. 3. The priority circuit interface 611 is typical of the circuits employed in connection with each of the priority circuits throughout the present application.

In FIG. 5, the priority circuit interface 611 includes a NAND gate 622, a bank of D-type flip-flops 623, a NOR gate 624, an OR gate 625 and a JK flip-flop 647. The NAND gate 622 receives the +BUS OP PENDING signal from the Q output of flip-flop 647. Flip-flop 647 is clocked to store the +SET BUS OP PENDING signal from an associated functional unit which desires access to the system bus. Flip-flop 647 responsively provides the +BUS OP PENDING signal on its Q output. A logical 1 for the +BUS OP PENDING signal signifies that the unit is ready to operate and is making a request to the system bus. The other input to NAND gate 622 is the -ENABLE SYS BUS DR signal derived from the Q2 output of the second stage of flip-flops 623. If the unit associated with the interface of FIG. 5 is currently enabled to place information on the system bus, the -ENABLE SYS BUS DR signal will be a logical 0 thus inhibiting gate 622 from being satisfied to honor any new request by the +BUS OP PENDING signal for access to the system bus. If the unit is not active to place information on the system bus, the -ENABLE SYS BUS DR signal willbe a logical 1 thereby enabling gate 622. When gate 622 is satisfied, its output enables a logical 0 for the -SET BUS REQ signal. On each positive-going transition of +CLK, the value of the -SET BUS REQ signal is stored in the first stage of flip-flops 623. When stored, the Q1 output from the first stage of flip-flops 623 provides the -BUS REQ SET signal. A logical 0 for that signal causes both the serial priority circuit and the parallel priority circuit to FIG. 4 to become active to designate the priority level of the associated unit.

Specifically, referring to FIG. 4, a logical 0 for the -BUS REQ SET signal forces the output of AND gate 646 to a logical 0 so that the serial priority circuit of FIG. 4 signals all lower-order serial priority circuits that the present serial priority circuit is active. Further, the -BUS REQ SET signal as a logical 0 is inverted to enable the NAND gates 640, 641 and 642 in FIG. 4 so that the parallel priority level set for the present unit is gated out onto the parallel lines -PRIORITY(1,2,4) REQUEST. In this way, both the serial priority and the parallel priority are activated.

In FIG. 5, the first stage of flip-flops 623 and the -BUS REQ SET signal remain active until the current unit actually obtains access to the system bus as signified by the -SET ENABLE SYS BUS DR signal being switched to a logical 0. That logical 0 is derived from NOR gate 636 in FIG. 4 at a point in time when the priority circuit of FIG. 4 and the associated unit has the highest priority.

That logical 0 from NOR gate 636 of FIG. 4 is clocked into the second stage of flip-flops 623 (see FIG. 5) on the next positive-going transition of +CLK so that the -ENABLE SYS BUS DR signal on the Q2 output is switched to a logical 0 thus disabling NAND gate 622 and forcing its output to a logical 1. That logical 1 is stored in the first stage of flip-flops 623 on the next positive-going transition of +CLK. When stored in the first stage, the logical 1 causes the -BUS REQ SET signal to become inactive as a logical 1. As described, the -BUS REQ SET signal is disabled two cycles after the unit obtains access.

The NOR gate 624 senses both the -BUS REQ SET and the -ENABLE SYS BUS DR signals from the Q1 and Q2 outputs of flip-flops 623. When both those signals are logical 0's, gate 624 provides a logical 1 to activate the +BUS REQ GRANTED signal with a logical 1. The logical 1 for +BUS REQ GRANTED causes flip-flop 647 to inactivate the +BUS OP PENDING signal and is clocked into the third stage of flip-flops 623 on the next positive-going transition of +CLK.

Means are provided in FIG. 5 to extend the duration of the access to the system bus for additional clock periods, as required. In a typical embodiment, that means includes the third stage of flip-flops 623. The Q3 output from the third stage and the +BUS REQ GRANTED signal from NOR gate 624 are connected as inputs to the OR gate 625 which provides the +HOLD BUS signal on its output. As long as either the output Q3 or +BUS REQ GRANTED is a logical 1, the +HOLD BUS signal will be enabled as a logical 1. That logical 1 is connected through gate 635 in FIG. 4 to the NOR gate 636 to hold the -SET ENABLE SYS BUS DR signal as a logical 0 for the desired duration. In the example of FIG. 5, the duration is three clock cycles long. In effect, the +HOLD BUS signal extends the active period two cycles beyond the one cycle that the -BUS REQ SET signal is active. Additional time could be added to the duration by adding fourth or subsequent stages to flip-flops 623 in the same manner that stage three was added and connected in FIG. 5.

Three Units With Priority Circuits—FIG. 6

In FIG. 6, an example of the priority circuit interconnection for three units is shown. The units 651, 652 and 653 can be any combination of the units 34, 34-1, 34-1', 36-1 through 36-N of FIG. 1 or any other units. The units 651, 652 and 653 are connected by the system bus 37. System bus 37 includes a parallel connection for the three parallel priority lines -PRIORITY(1,2,4) REQUEST The units 651, 652 and 653 include priority circuits (PC) 215-1, 215-2, and 215-3, respectively. Each of these priority circuits is like the priority circuit of FIG. 4. The units 651, 652 and 653 also include functional units and interfaces 31-1, 31-2 and 31-3, respectively, each having priority circuit interfaces (PCIF) 611-1, 611-2 and 611-3, respectively. Each of these priority circuit interfaces 611-1, 611-2 and 611-3 is like or similar to the priority circuit interface of FIG. 5. The units 651, 652 and 653 include system bus interfaces (SBIF) 610-1, 610-2 and 610-3, respectively, each like the system bus interface of FIG. 3. The interfaces all provide the +BUS BUSY IN and the +MEMORY BUSY IN signals to the respective priority circuits along with clock signals and any other interface signals that may be desired.

Each of the units 651, 652 and 653 includes a number of other signals. Corresponding signals have the same name but have different postscripts "X" where X is -1, -2 or -3, to designate the one of the units 651, 652 and 653, respectively, to which they correspond. Specifically, the units include the serial priority signals -BUS REQUEST IN-X and the -BUS REQUEST OUT-X. Further, the priority circuits 215-X connect with the priority circuit interfaces 611-X by the signals -SET ENABLE SYS BUS DR-X, +HOLD BUS-X and -REQ SET-X. Further, the priority circuit interfaces receive the +SET BUS OP PENDING-X signals from a portion of the functional unit 31-X and each provide an -ENABLE SYS BUS DR-X signal which connects to driver circuits 202 and 203 (see FIG. 3) in the interfaces 610-X.

In FIG. 6, the priority setting signals -PRIORITY(1, 2, 4) are set to logical 011 for the priority circuit 215-1. Similarly, the priority circuits 215-2 and 215-3 have their parallel priority -PRIORITY(1, 2, 4) set to binary 111 on their parallel priority inputs. Accordingly, the priority circuit 215-1 and the associated unit 651 has higher parallel priority than the priority circuits 215-2 and 215-3 and the associated units 652 and 653.

In FIG. 6, the serial priority line -BUS REQUEST OUT-3 from the priority circuit 215-3 connects via line 609 to the serial priority line -BUS REQUEST IN-2 of the priority circuit 215-2. Accordingly, units 652 and 653 have the same parallel priority while the unit 653 has higher-order serial priority than the unit 652. Unit 652 has lower-order serial priority than unit 653.

Priority Circuit Operation - FIG. 7

In FIG. 7, the waveforms representative of the operation of the FIG. 6 apparatus are shown. The basic timing for the operations are controlled by the +CLK signal derived from the system bus clock -CLOCK in each interface 610-X. At C3 time, it has been assumed for purposes of explanation that neither the memory nor the bus are busy so that the +BUS BUSY IN and +MEMORY BUSY IN signals are both logical 0. The signal +BUS BUSY IN goes in active to 0 at C3.

It is also assumed at C3 time that all three of the units 651, 652 and 653 are requesting access to the system bus 37. This is evident by the logical 1 for all the signals +BUS OP PENDING-1, +BUS OP PENDING-2 and +BUS OP PENDING-3 at C3 time. Prior to C3 time, the parallel priority request lines, -PRIORITY(1, 2, 4) REQUEST are all logical 1's indicating the lowest level of parallel priority. At C3 time, the -BUS REQ SET-1 signal is switched active as a logical 0. At C3 time, referring to FIGS. 4 and 7, the -BUS REQ SET-1 signal is inverted to enable the NAND gates 640, 641 and 642 to gate the parallel priority level of unit 1 onto the parallel priority unit bus through the terminals 604-1 of FIG. 6. Since the -PRIORITY 1 line for priority circuit 215-1 is a logical 0, that 0 is inverted in inverter 643 of FIG. 4 to provide two logical 1's to the NAND gate 640. Accordingly, at C3 time, the parallel priority is 011 as indicated by the waveforms in FIG. 7. After C3 time, the priority circuit 215-1 (see FIGS. 4 and 6) will have at least one logical 0 input to each of the gates 629 through 632. Gates 629 and 630 will have logical 0's from the inverters 626 and 627. Gate 31 will have a logical 0 from the -PRIORITY 1 line. The +BUS BUSY IN signal is also a logical 0 through gate 632. Accordingly, for the priority circuit 215-1, the output from NOR gate 633 is a logical 1 thus enabling the AND gate 634.

After C3 time, each of the priority circuits 215-2, 215-3 of FIG. 6 (see FIG. 4) will have a logical 1 output from the corresponding AND gate 631. A logical 1 occurs, because for both circuits 215-2 and 215-3, the -PRIORITY 1 signal is a logical 1 while the -PRIORITY 1 REQUEST signal is a logical 0 inverted to a logical 1 by inverter 628. The logical 1 output from AND gate 631 forces the output from NOR gate 633 to a logical 0 thereby inhibiting AND gate 634. The logical 0 from gate 634 together with the 0 from gate 635, produces a logical 1 for the -SET ENABLE SYS BUS DR-2 and the -SET ENABLE SYS BUS DR-3 signals. Since gate 634 is inhibited, the +HOLD BUS-2 and the +HOLD BUS-3 signals never get enabled to a logical 1.

For the unit 1 priority circuit 215-1 of FIG. 6 (see FIG. 4) the AND gate 634 is satisfied after C3 time. The 1 output from gate 634 forces the output from NOR gate 636 to a logical 0 at C3 time activating the -SET ENABLE SYS BUS DR-1 signal. On the next positive-going transition of +CLK at C5 time, -ENABLE SYS BUS DR-1 is switched to a logical 0 (see FIG. 5) as indicated in FIG. 7. After C5 time and up until C7 time, both -BUS REQ SET-1 and -ENABLE SYS BUS DR-1 are both logical 0's so that the +BUS REQ GRANTED output from NOR gate 624 is a logical 1 during this period. The logical 1 for +BUS REQ GRANTED causes the +HOLD BUS-1 output of OR gate 625 to be active as a logical 1 during C5 to C7 time. At C7 time, that logical 1 is stored through the D3 input into the third stage of flip-flops 623. Therefore, at C7 time, the Q3 output is switched from a logical 0 to a logical 1 which continues to hold the output from OR gate 625 as a logical 1 for the +HOLD BUS-1 signal. At C9 time, the third stage and the Q3 output of flip-flops 623 are switched back to a logical 0. After C9 time, that 0 on the Q3 output has caused the +HOLD BUS-1 signal to be switched to an inactive logical 0 causing −SET ENABLE SYS BUS DR-1 to be inactive as a logical 1. At C11 time, that logical 1 is clocked into the second stage of flip-flops 623 causing −ENABLE SYS BUS DR-1 to go inactive as a logical 1. At C9 time, the +BUS BUSY IN signal goes inactive as a logical 0 indicating the end of the operation of unit 651 one cycle earlier than the end at C11 time.

After C7 time when -PRIORITY 1 REQUEST returns inactive, the parallel priority lines -PRIORITY(1, 2, 4) REQUEST are all logical 1's meaning that the priority circuits 215-2 and 215-3 then have highest parallel priority since priority circuit 215-1 (and associated unit 651) no longer has a pending operation. Both the units 652 and 653 are requesting access to the bus since +BUS OP PENDING-2 and +BUS OP PENDING-3 each are logical 1. At C11 time, unit 651 is not requesting access time since +BUS OP PENDING-1 is a logical 0. Since units 652 and 653 have the same parallel priority, the serial priority circuitry causes the higher-order unit 652 to have priority before the lower-order unit 652.

As can be seen from an examination of FIG. 4 and FIG. 6, the −BUS REQUEST IN-3 serial priority signal is connected to a logical1. That logical 1 will satisfy AND gate 634 in the priority circuit 215-3 (see FIG. 4 also). However, a logical 0 for the −BUS REQ SET-3 signal (see FIGS. 4 and 7) will force the output from an AND gate 646 (see FIG. 4) to a logical 0 for the −BUS REQ OUT-3 signal which in turn is connected as the −BUS REQUEST IN-2 signal. The logical 0 for the −BUS REQUEST IN-2 signal (see FIG. 4) will inhibit the corresponding AND gate 634 and the priority circuit 215-2.

In FIG. 7, +BUS OP PENDING-3 and +BUS REQ SET-3 have been active at least since after C3 time. Accordingly, when +BUS BUSY IN goes inactive at C9 time, the priority circuit 215-3 (see FIGS. 4 and 7) has its corresponding AND gate 634 satisfied causing −SET ENABLE SYS BUS DR-3 to be active as a logical0 at C9 time when +BUS BUSY IN goes inactive to a logical 0.

Referring to FIGS. 5, 6 and 7, at C11 time, the −ENABLE SYS BUS DR-3 signal is clocked to a logical 0, which in turn disables the NAND gate 622. At C13 time, a 1 is clocked into the first stage of flip-flops 623 and inactivates the −BUS REQ a 1 is clocked into the SET-3 signal as a logical 1. During the period between C11 and C13 time when −BUS REQ SET-3 and -ENABLE BUS DR-3 are both 0, NOR gate 624 of FIG. 5 activates the +BUS REQ GRANTED-3 signal as a logical 1. In the priority circuit 215-3 of FIG. 6, and referring to FIGS. 5, 6 and 7, stage three of flip-flops 623 is not employed. For example, the input D3 is disconnected from the output of gate 624 and is connected to logical 0 (not shown). With these connections the +HOLD BUS-3 signal is always a logical 0 and does not extend the duration of the −ENABLE SYS BUS DR-3 signal beyond the one cycle between C11 and C13. The timing for the +BUS BUSY IN and the +MEMORY BUSY IN signals between C9 and C23 time is the same as the timing between C1 time and C15 time in FIG. 12 of the above-identified corresponding application entitled DATA PROCESSING APPARATUS AND METHOD WITH ENCODED SYSTEM BUS. As long as the +BUS BUSY IN signal is held active as a logical 1, the unit 652 of FIG. 6 cannot obtain priority to access the system bus. At C21 time when +BUS BUSY IN and +MEMORY BUSY IN become inactive, unit 652 of FIG. 6 obtains priority for accessing the system bus.

Further and other Embodiments

The embodiment of FIG. 6 employed two different parallel priorities, namely, a priority 0, that is, "111" for -PRIORITY(4, 2, 1) and a priority 1, that is, a "110" for -PRIORITY(4, 2, 1).

It if is desired to extend the parallel priority to the full binary capability of eight different parallel priority levels, namely, levels 0, 1, ..., 7 (binary 000 to binary 111), then it is necessary to modify the parallel priority circuitry in order to avoid ambiguity in the parallel priority signals. One modification to avoid ambiguity is to alter the parallel priority circuit 612 of FIG. 4 to include means for inhibiting a parallel priority output onto the parallel priority bus -PRIORITY 4 REQUEST, -PRIORITY 2 REQUEST and -PRIORITY 1 REQUEST if a higher parallel priority circuit has already energized any of those lines. Such a modification operates such that changes in the granted priority tend to ripple up and down the parallel priority bus. The time delay waiting for the ripple is undesirable. The number of ripple delays down the priority bus, in general, will not be greater than the number of binary digits in the encoded priority. Accordingly, for the three binary digits, 1, 2, and 4 of the present example, three ripple delays can be encountered. If a 4-digit binary 1, 2, 4, 8 parallel priority code were employed, then four ripple delays could be encountered. In an example where six binary digits were used for the parallel priority, up to 64 different parallel priorities are available and the priority determination can encounter up to six ripple delays. If a serial priority technique were employed for those same 64 units, then 64 single logic level delays would be encountered versus six multiple logic level ripple delays for the parallel binary encoded priority. As is apparent from the above examples, for large numbers of priority levels, the parallel encoded priority circuitry still has significantly less delay then serial priority circuitry.

In order to avoid the disadvantages of ripple delays in parallel priority circuits, the priority request lines may be judiciously broken so as to avoid any ambiguity and hence so as to avoid any ripple delays. For the three binary encoded parallel priority lines -PRIORITY 4 REQUEST, -PRIORITY 2 REQUEST, and -PRIORITY 1 REQUEST [also designated -PRIORITY(1, 2, 4) REQUEST or -PRIORITY(4, 2, 1) REQUEST] of the embodiment describe,d, the following CHART I designates how parallel priority request lines are formed to avoid ambiguity of operation.

CHART I

| PARALLEL PRIORITY LEVEL | -PRIORITY "X" REQUEST LINE | | | | | | |
|---|---|---|---|---|---|---|---|
| | 4 | 2 | | 1 | | | |
| | 4 | $2_1$ | $2_2$ | $1_1$ | $1_2$ | $1_3$ | $1_4$ |
| 0 (lowest) | 1 | 1 | | 1 | | | |
| 1 | 1 | 1 | | 0 | | | |
| 2 | 1 | | 0 | | 1 | | |
| 3 | 1 | | 0 | | 0 | | |
| 4 | 0 | 1 | | | | 1 | |
| 5 | 0 | 1 | | | | 0 | |
| 6 | 0 | | 0 | | | | 1 |
| 7 (highest) | 0 | | 0 | | | | 0 |

In CHART I, only a single -PRIORITY 4 REQUEST line is employed. The -PRIORITY 2 REQUEST line is formed as two lines, namely the -PRIORITY $2_1$ REQUEST line and the -PRIORITY $2_2$ REQUEST line. Similarly, the -PRIORITY 1 REQUEST line is broken into four lines, namely -PRIORITY $1_1$ REQUEST, -PRIORITY $1_2$ REQUEST, -PRIORITY $1_3$ REQUEST and -PRIORITY $1_4$ REQUEST.

As indicated in CHART I, the unit having unit priority level 0 connects to the -PRIORITY 4 REQUEST, the -PRIORITY $2_1$ REQUEST and the -PRIORITY $1_1$ REQUEST lines. The unit with parallel priority level 1 also connects to the same three lines. The level 0 unit gates "111" onto the -PRIORITY(4, 2, $1_1$) REQUEST line while the level 1 unit gates "110" onto the same line. Only the two level 0 and level 1 units receive the -PRIORITY $1_1$ REQUEST line. In FIG. 4, the -PRIORITY 1 REQUEST line is replaced by the -PRIORITY $1_1$ REQUEST line. Similarly, for the level 0 and level 1 units, in FIG. 4, the -PRIORITY 2 REQUEST line is replaced by the -PRIORITY $2_1$ REQUEST line.

The unit with parallel priority level 2 connects to the -PRIORITY 4 REQUEST, -PRIORITY $2_1$ REQUEST and -PRIORITY $1_2$ REQUEST lines. Similarly, each of the units with parallel unit priority 3 through 7 connects to the lines as indicated in CHART I and in the manner described above.

As will be evident from inspection of CHART I, only three parallel priority lines are required for any unit to implement the priority scheme of CHART I. The priority 4 line is unbroken, the priority 2 line is broken into two parts and the priority 1 line is broken into four parts for a total of seven different lines. Any given unit, however, only connects to three of those seven lines.

With the combination of parallel priority and serial priority in the present invention, priority determination for many units can be determined all within one clock cycle of the data processing system. For example, if the eight parallel priority levels of CHART 1 are each combined with eight serial priority levels, a total of 64 priority determinations can readily be made within one clock cycle of the data processing system.

While the embodiments have been described with one priority circuit and one serial priority circuit for each priority circuit means, only a single parallel priority circuit need be employed for each string of serial priority circuits.

While the present embodiments have been described for determining priority of access to a system bus, the present invention may be employed, of course, for priority determinations of any operation.

While the present invention has been described in which memory busy and bus busy signals both have been employed to inhibit the granting of priority, either or both of those signals may be eliminated; or, alternatively, other signals may be employed for inhibiting the granting of priority.

While the invention has been particularly shown and described with reference to the preferred embodiments thereof, it will be understood by those skilled in the art that those changes in form and details may be made therein without departing from the spirit and scope of the invention.

What is claimed is:

1. In a data processing system including a plurality of units and including a system bus for interconnecting said units, where each of said units includes means for providing a bus request signal for signalling a request for access to the system bus and includes means responsive to an enabling signal for enabling access to the system bus, priority apparatus for determining priority of access to said system bus by said units, said priority apparatus comprising, a plurality of priority circuit means, one for each of said units, each one of said priority circuit means connected for controlling the enabling signal of a corresponding one of said units, each one of said priority circuit means including a parallel priority circuit and a serial priority circuit, parallel priority bus means connected in parallel among said parallel priority circuits for carrying parallel priority signals representing a priority level, said parallel priority circuit for each one of said priority circuit means including, means for setting a parallel priority level for said parallel priority circuit, means for gating said parallel priority level onto said parallel priority bus to generate parallel priority signals when enabled by said bus request signal from an associated one of said units, means for comparing said parallel priority signals from said parallel priority bus with said parallel priority level to provide a parallel priority enable signal when said parallel priority level is equal to or greater than the parallel priority signals from said parallel priority bus, and when enabled by said bus request signal from an associated one of said units, means for preselecting the parallel priority level the same for each one of a first group of said priority circuit means, said serial priority circuit for each of said priority circuit means including, logic means, connected to receive a serial priority input signal and said bus request signal for providing a serial priority output signal whenever either said serial priority input signal or said bus request signal is active, means for connecting each said serial priority circuit within said first group of said priority circuit means in an ordered series with each serial priority output signal connected to provide the serial priority input signal of a next lower-order one of said serial priority circuits, and means for providing a fixed serial priority input signal to the highest order one of said serial priority circuits within said first group, each of said priority circuit means including means responsive to said parallel priority enable signal being active and said serial priority input signal being inactive to provide said enabling signal to enable access to said system bus.

2. The apparatus of claim 1 further includes means for preselecting the parallel priority level the same for each one of a second group of said priority circuit means, means for connecting each said serial priority circuit within said second group of said priority circuit means in an ordered series with each serial priority output signal connected to provide the serial priority input signal of a next lower-order one of said serial priority circuits.

3. The apparatus of claim 1 wherein said parallel priority bus is an encoded bus for carrying said parallel priority signals as encoded signals.

4. The system of claim 3 where said parallel priority bus includes a high-order line and a low-order line and wherein said low-order line is broken into parts, each of said parts connected to fewer ones of said parallel priority circuits than said high-order line whereby ambiguity in said parallel priority signals is avoided.

5. The system of claim 4 wherein the code is binary and wherein said low-order line has twice as many parts as the high-order line.

6. The apparatus of claim 1 wherein said system bus includes a system bus busy line connected in parallel to each of said units for indicating with a bus busy signal when said system bus is busy and wherein said parallel priority circuit for each one of said priority circuit means includes means responsive to said bus busy signal to inhibit said enabling signal whenever said bus busy signal is active.

7. The apparatus of claim 1 wherein one of said units is a memory unit and wherein said system bus includes a memory busy line connected in parallel to each of said units to provide a memory bus signal for indicating when said memory unit is busy and wherein said parallel priority circuit for each one of said priority circuit means includes means responsive to said memory busy signal to inhibit said enabling signal whenever said memory busy signal is active.

8. A data processing system including a plurality of units, including a system bus for interconnecting said units, where each of said units includes means for providing a request signal for signalling a request for operation and includes means responsive to an enabling signal for enabling such operation, and including priority apparatus for determining priority of operation among said units, said priority apparatus comprising, a plurality of priority circuit means, one for each of said units, each one of said priority circuit means connected for controlling the enabling signal for a corresponding unit, each one of said priority circuit means including a parallel priority circuit and a serial priority circuit, parallel priority bus means connected in parallel among said parallel priority circuits, each one of said parallel priority circuits including, means for setting a parallel priority level for said parallel priority circuit onto said parallel priority bus when enabled by said request signal from an associated one of said units, means for comparing said parallel priority signals from said parallel priority bus with said parallel priority level to provide a parallel priority enable signal when said parallel priority level is greater than said priority signals, and when enabled by said request signal from an associated one of said units, means for connecting each said serial priority circuit within said priority circuit means having parallel priority circuits of the same priority level in an ordered series with a serial priority output signal of a higher-order one connected to provide the serial priority input signal of a next lower-order one of said serial priority circuits, each of said priority circuit means including means responsive to said parallel priority enable signal being active and said serial priority input signal of a higher-order one of said serial priority circuits being inactive to provide said enabling signal to enable operation of a corresponding unit.

9. The data processing system of claim 8 wherein, said system bus has operation code field means for transmitting an encoded system operation code and has system information field means for transmitting associated system information where the associated system information has a function determined by the system operation code, said plurality of units includes one or more first units connected to said system bus, said first units including means for generating system operation codes for transmission by the operation code field of said system bus and including means for generating associated system information for transmission by the information field of said system bus, said plurality of units includes one or more second units connected to said system bus, said second units including means for accepting a predetermined system operation code and associated system information from said system bus and including means for decoding the predetermined system operation code to perform a function with the associated system information, and, access control means responsive to said priority circuit means for controlling the access of said units to said system bus.

10. The data processing system of claim 9 wherein one of said first or second units is a storage unit connected to said system for transferring information between said storage unit and the other of said first and second units.

11. The system of claim 9 wherein said system bus includes means for transmitting a system clock signal to each of said units and wherein each of said units includes a system bus interface, said interface including means for latching information from said bus under control of said system bus clock signal and including means for gating information onto said system bus in synchronism with said system clock signal.

* * * * *